(12) United States Patent
Lu et al.

(10) Patent No.: US 12,238,220 B2
(45) Date of Patent: Feb. 25, 2025

(54) BLOCKCHAIN-BASED WORKFLOW NODE CERTIFICATION METHOD AND DEVICE

(71) Applicant: Shanghai NanoJClean Technology Co., Ltd., Shanghai (CN)

(72) Inventors: Duanxin Lu, Shanghai (CN); Qiangle Geng, Shanghai (CN); Bangya Ma, Shanghai (CN); Jianliang Gu, Shanghai (CN)

(73) Assignee: Shanghai NanoJClean Technology Co., Ltd., Shanghai (CN)

( * ) Notice: Subject to any disclaimer, the term of this patent is extended or adjusted under 35 U.S.C. 154(b) by 0 days.

(21) Appl. No.: 17/768,349

(22) PCT Filed: Oct. 14, 2020

(86) PCT No.: PCT/CN2020/120771
§ 371 (c)(1),
(2) Date: Apr. 12, 2022

(87) PCT Pub. No.: WO2021/073516
PCT Pub. Date: Apr. 22, 2021

(65) Prior Publication Data
US 2024/0154813 A1 May 9, 2024

(30) Foreign Application Priority Data
Oct. 14, 2019 (CN) .......................... 201910973162.6

(51) Int. Cl.
*H04L 9/32* (2006.01)
*G06Q 10/10* (2023.01)
*H04L 9/00* (2022.01)

(52) U.S. Cl.
CPC ......... *H04L 9/3239* (2013.01); *G06Q 10/103* (2013.01); *H04L 9/50* (2022.05)

(58) Field of Classification Search
None
See application file for complete search history.

(56) References Cited

U.S. PATENT DOCUMENTS 6,115,690 A * 9/2000 Wong ................. G06Q 30/0201
705/30
7,581,011 B2 * 8/2009 Teng ..................... H04L 63/0823
709/229

(Continued)

FOREIGN PATENT DOCUMENTS

CN 103279840 A 9/2013
CN 110113334 A 8/2016

(Continued)

OTHER PUBLICATIONS

Hukkinen et al.; Distributed Workflow Management with Smart Contracts; Aalto University, School of Science, Department of Industrial Engineering and Management (Year: 2017).*

(Continued)

*Primary Examiner* — Kambiz Zand
*Assistant Examiner* — Mahabub S Ahmed
(74) *Attorney, Agent, or Firm* — Downs Rachlin Martin PLLC

(57) ABSTRACT

A blockchain-based workflow node certification method includes a certification party establishing a general workflow template. The general workflow template includes a plurality of workflow nodes each having an audit attribute for indicating whether the workflow node needs to be certified. The certification party establishes a general data template based on the general workflow template, and the general data template and the general workflow template are instantiated. A current workflow node is acquired in the instantiated general workflow template, and whether the current workflow node needs to be certified-is determined, based on the audit attribute. Certification, if needed, is performed by (Continued)

a centralized certification party, and users can create and modify transaction processes as needed to meet the needs of changeable transactions. By combining central certification with blockchain certification deposition, the security of workflow node process implementation and the privacy of specific data are ensured.

10 Claims, 2 Drawing Sheets

(56) References Cited

U.S. PATENT DOCUMENTS

| | | | | |
|---|---|---|---|---|
| 9,998,286 | B1* | 6/2018 | Ramathal | G06F 21/33 |
| 11,321,718 | B1* | 5/2022 | Narendranathan | G06F 21/64 |
| 11,507,562 | B1* | 11/2022 | Luedtke | H04L 9/50 |
| 2002/0138543 | A1* | 9/2002 | Teng | G06Q 10/06 |
| | | | | 707/E17.005 |
| 2002/0138577 | A1* | 9/2002 | Teng | G06F 16/986 |
| | | | | 709/205 |
| 2002/0152254 | A1* | 10/2002 | Teng | G06Q 10/10 |
| | | | | 718/100 |
| 2002/0174238 | A1* | 11/2002 | Sinn | H04L 67/306 |
| | | | | 709/205 |
| 2007/0143398 | A1* | 6/2007 | Graham | G06Q 40/02 |
| | | | | 709/204 |
| 2014/0047028 | A1* | 2/2014 | Buth | G06F 9/546 |
| | | | | 709/204 |
| 2016/0330027 | A1* | 11/2016 | Ebrahimi | H04L 9/3066 |
| 2017/0041296 | A1* | 2/2017 | Ford | G06F 21/64 |
| 2017/0236084 | A1* | 8/2017 | Sullivan | H04L 67/10 |
| | | | | 705/7.26 |
| 2017/0244757 | A1 | 8/2017 | Castinado et al. | |
| 2017/0366348 | A1* | 12/2017 | Weimer | H04L 9/0618 |
| 2018/0101848 | A1* | 4/2018 | Castagna | H04L 9/3236 |
| 2018/0150835 | A1* | 5/2018 | Hunt | G06Q 20/3827 |
| 2018/0157825 | A1* | 6/2018 | Eksten | H04L 9/3239 |
| 2018/0276625 | A1* | 9/2018 | Saye | G06Q 20/3825 |
| 2018/0285996 | A1* | 10/2018 | Ma | H04L 9/0637 |
| 2018/0315055 | A1* | 11/2018 | Pickover | G06F 21/6245 |
| 2019/0026685 | A1* | 1/2019 | Chappell | G06Q 10/087 |
| 2019/0164157 | A1* | 5/2019 | Balaraman | G06Q 20/36 |
| 2019/0166116 | A1* | 5/2019 | Kumar | H04L 9/0825 |
| 2019/0188701 | A1* | 6/2019 | Parsons | H04L 9/14 |
| 2019/0205870 | A1 | 7/2019 | Kamalsky et al. | |
| 2019/0205884 | A1* | 7/2019 | Batra | G06Q 20/4014 |
| 2019/0251199 | A1* | 8/2019 | Klianev | G06Q 40/04 |
| 2019/0251566 | A1* | 8/2019 | Pan | H04L 9/0637 |
| 2019/0251573 | A1* | 8/2019 | Toyota | H04L 9/3236 |
| 2019/0384587 | A1* | 12/2019 | Rao | G06F 21/572 |
| 2019/0384842 | A1* | 12/2019 | Rao | H04L 9/3213 |
| 2020/0028691 | A1* | 1/2020 | Rao | G06F 8/658 |
| 2020/0119905 | A1* | 4/2020 | Revankar | G06Q 20/06 |
| 2020/0125393 | A1* | 4/2020 | Shi | G06F 9/542 |
| 2020/0125427 | A1* | 4/2020 | Guan | G06F 21/64 |
| 2020/0128022 | A1* | 4/2020 | Bleikertz | H04L 9/3247 |
| 2020/0145229 | A1* | 5/2020 | Li | H04L 9/3247 |
| 2020/0177373 | A1* | 6/2020 | Komandur | H04L 9/0894 |
| 2020/0211000 | A1* | 7/2020 | Narasimhan | G06Q 20/3678 |
| 2020/0218815 | A1* | 7/2020 | Haque | G06F 21/645 |
| 2020/0250174 | A1* | 8/2020 | Padmanabhan | G06F 7/14 |
| 2020/0252404 | A1* | 8/2020 | Padmanabhan | H04L 63/061 |
| 2020/0259638 | A1* | 8/2020 | Carmignani | H04L 9/085 |
| 2020/0259658 | A1* | 8/2020 | Libsch | H04L 9/3234 |
| 2020/0344132 | A1* | 10/2020 | Padmanabhan | H04L 9/0637 |
| 2021/0065167 | A1* | 3/2021 | Rafferty | G06Q 20/20 |
| 2021/0105142 | A1* | 4/2021 | Lee | H04L 9/3247 |
| 2022/0358579 | A1* | 11/2022 | Sliwka | G06Q 40/03 |
| 2023/0274244 | A1* | 8/2023 | Quigley | G06F 21/602 |
| | | | | 705/65 |
| 2023/0274245 | A1* | 8/2023 | Quigley | G06Q 20/02 |
| | | | | 705/65 |
| 2024/0007329 | A1* | 1/2024 | Doney | G06F 16/2379 |

FOREIGN PATENT DOCUMENTS

| | | |
|---|---|---|
| CN | 106888087 A | 6/2017 |
| CN | 108922012 A | 11/2018 |
| CN | 109767190 A | 5/2019 |
| CN | 110163755 A | 8/2019 |
| CN | 110278246 A | 9/2019 |
| CN | 110928534 A | 3/2020 |
| WO | 201909005 A1 | 5/2019 |

OTHER PUBLICATIONS

Gil, et al., "Wings for Pegasus: Creating Large-Scale Scientific Applications Using Semantic Representations of Computational Workflows." Proceedings of the Nineteenth Conference on Innovative Applications of Artificial Intelligence (IAAI-07), Jul. 22-26, 2007.

Zikratov et al., "Ensuring Data Integrity Using Blockchain Technology." Proceeding of the 20th Conference of FRUCT Association, pp. 534-539. Apr. 3, 2017.

Anisetti M. et al., "Test-Based Security Certification of Composite Services." ACM Transactions on the Web (TWEB), Dec. 4, 2018, vol. 13, No. 1, Article No. 3, pp. 1-43.

* cited by examiner

| process_id | |
|---|---|
| process_name | |
| definitions | Workflow node 1 |
| | Workflow node 2 |
| | ...... |
| | Workflow node N |

| uuid | |
|---|---|
| name | |
| version | |
| languageType | |
| contentType | |
| required | |
| validation | |
| content | Data 1 |
| | Data 2 |
| | ...... |
| | Data N |

BLOCKCHAIN-BASED WORKFLOW NODE CERTIFICATION METHOD AND DEVICE

TECHNICAL FIELD

The present disclosure relates to the field of workflow information security, and more particularly, to a blockchain-based workflow node certification method and device.

BACKGROUND

In a current software system, there are two ways to implement specific transaction processes. One way is to directly implement specific functions with code after collecting demands and write the code into the software system. The other way is to write the code into the software system in a process modeling manner. Users can flexibly modify the transaction process as needed.

However, in the prior art, no excellent security determination mechanism has been established for the security of specific data of workflow nodes, and there are risks such as data tampering and data leakage.

Summary of the Invention

In order to solve the above technical problem, the present disclosure provides a blockchain-based workflow node certification method and device. The method and the device are configured to solve the technical problems of data tampering and data leakage caused by the lack of a scheme for certifying specific data of workflow nodes in the prior art.

According to a first aspect of the present disclosure, a blockchain-based workflow node certification method is provided, including:

step S101: establishing, by a certification party, a general workflow template using a JSON language, the general workflow template comprising a plurality of workflow nodes each having an audit attribute for indicating whether the workflow node needs to be certified;

step S102: establishing, by the certification party, a general data template using the JSON language based on the general workflow template, the general data template defining data needing to be collected and transmitted in a workflow execution process;

step 5103: instantiating the general data template and the general workflow template; and step 5104: acquiring a current workflow node in the instantiated general workflow template, determining, based on the audit attribute, whether the current workflow node needs to be certified, if yes, certifying, by a centralized certification party, data needing to be received or sent by the current workflow node defined in the general workflow template and a data template defined in an instantiating process, and depositing certification, by a blockchain, for the data needing to be received by the current workflow node and the data template received in the instantiating process, the certification and certification deposition for the data template referring to the certification and certification deposition for specific data in the data template.

Further, the general data template has uuid, name, version, languageType, contentType, required, validation, and content fields, the uuid field is configured to define a unique identifier of the general data template, the name field is configured to define a name of the general data template, the version field is configured to define a version of the general data template, the languageType field defines a language type implementing the general data template, the content-Type field defines a data type, the required field defines whether the data is required, the validation field is configured for logical validation, and may contain a validation script or link to external services to determine whether a data format is correct, and the content field may be nested with other data templates.

Further, step S104 includes:

step 51041: acquiring a current workflow node in the instantiated general workflow template, determining, based on the audit attribute, whether the current workflow node needs to be certified, if yes, proceeding to step S1042, and if no, proceeding to step S1044;

step 51042: acquiring the instantiated current workflow node, acquiring data needing to be received or sent, which is defined in the general workflow template by the current workflow node, and a data template defined in an instantiating process, and sending the data and the data template to the certification party for certification audit;

step 51043: after passing the certification audit, performing, by the certification party, Hash calculation on the data and the data template to obtain a Hash value, and sending the Hash value to the blockchain for certification deposition;

step S1044: determining whether the current workflow node is an end node, if yes, ending the method, and if no, proceeding to step 51045; and step S1045: setting the current workflow node as a next workflow node, and proceeding to step S1042.

Further, after the blockchain completes the certification deposition and synchronization, the certification party obtains an ID of the certification deposition operation, and associates the ID with original data.

According to a second aspect of the present disclosure, a blockchain-based workflow node certification device is provided, including:

a general workflow template module, configured to establish, by a certification party, a general workflow template using a JSON language, the general workflow template comprising a plurality of workflow nodes each having an audit attribute for indicating whether the workflow node needs to be certified;

a general data template module, configured to establish, by the certification party, a general data template using the JSON language based on the general workflow template, the general data template defining data needing to be collected and transmitted in a workflow execution process;

an instantiating module, configured to instantiate the general data template and the general workflow template; and a certification and deposition module, configured to acquire a current workflow node in the instantiated general workflow template, determine, based on the audit attribute, whether the current workflow node needs to be certified, if yes, certify, by a centralized certification party, data needing to be received or sent by the current workflow node defined in the general workflow template and a data template defined in an instantiating process, and deposit certification, by a blockchain, for the data needing to be received by the current workflow node and the data template received in the instantiating process, the certification and certification deposition for the data template referring to the certification and certification deposition for specific data in the data template.

Further, the general data template has uuid, name, version, languageType, contentType, required, validation, and content fields, the uuid field is configured to define a unique identifier of the general data template, the name field is configured to define a name of the general data template, the version field is configured to define a version of the general data template, the languageType field defines a language type implementing the general data template, the contentType field defines a data type, the required field defines whether the data is required, the validation field is configured for logical validation, and may contain a validation script or link to external services to determine whether a data format is correct, and the content field may be nested with other data templates.

Further, the certification and certification deposition module includes:
- a first determination sub-module, configured to acquire a current workflow node in the instantiated general workflow template, and determine, based on the audit attribute, whether the current workflow node needs to be certified;
- a certification sub-module, configured to acquire the instantiated current workflow node, acquire data needing to be received or sent, which is defined in the general workflow template by the current workflow node, and a data template defined in an instantiating process, and send the data and the data template to the certification party for certification audit;
- a deposition sub-module, configured to perform, by the certification party, Hash calculation on the data and the data template after passing the certification audit to obtain a Hash value, and send the Hash value to the blockchain for certification deposition;
- a second determination sub-module, configured to determine whether the current workflow node is an end node; and
- a setting sub-module, configured to set the current workflow node as a next workflow node.

Further, an association sub-module is also included, which is configured to obtain, by the certification party, an ID of the certification deposition operation after the blockchain completes the certification deposition and synchronization, and associate the ID with original data.

According to a third aspect of the present disclosure, a blockchain-based workflow node certification system is provided, including:
- a processor, configured to execute a plurality of instructions; and
- a memory, configured to store the plurality of instructions.

The plurality of instructions are configured to be stored by the memory and loaded by the processor to perform the blockchain-based workflow node certification method as described previously.

According to a fourth aspect of the present disclosure, a computer-readable storage medium is provided. The storage medium stores a plurality of instructions therein that are configured to be loaded by a processor and perform the blockchain-based workflow node certification method as described previously.

According to the above solution of the present disclosure, users can create and modify transaction processes as needed to meet the needs of changeable transaction. By combining central certification with blockchain certification deposition and certifying workflow node data needing to be certified, the security of workflow node process implementation and the privacy of specific data are ensured.

The above description is only an overview of the technical solution of the present disclosure. In order to understand the technical means of the present disclosure more clearly and implement it in accordance with the content of the specification, preferred embodiments of the present disclosure will be described in detail below with the accompanying drawings.

BRIEF DESCRIPTION OF THE DRAWINGS

The drawings constituting a part of the present disclosure are used to provide a further understanding of the present disclosure. The present disclosure provides the following drawings for illustration. In the drawings.

DETAILED DESCRIPTION

Figure 1:
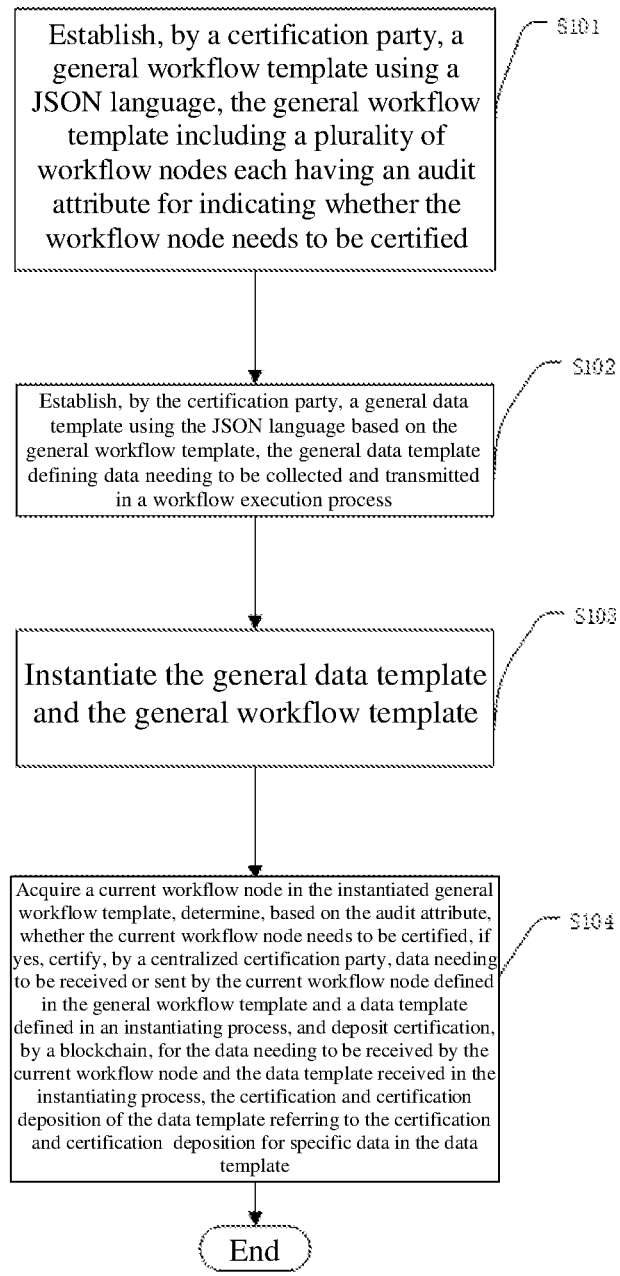
FIG. 1 is a flowchart of a blockchain-based workflow node certification method according to the present disclosure.

FIG. 1 is a flowchart of one example implementation of a blockchain-based workflow node certification method according to the present disclosure. As shown in FIG. 1, the method includes the following steps:

step S101: establishing, by a certification party, a general workflow template using a JSON language, the general workflow template comprising a plurality of workflow nodes each having an audit attribute for indicating whether the workflow node needs to be certified;

step S102: establishing, by the certification party, a general data template using the JSON language based on the general workflow template, the general data template defining data needing to be collected and transmitted in a workflow execution process;

step S103, instantiating the general data template and the general workflow template; and step S104, acquiring a current workflow node in the instantiated general workflow template, determining, based on the audit attribute, whether the current workflow node needs to be certified, if yes, a centralized certification party certifying data needing to be received or sent by the current workflow node defined in the general workflow template and a data template defined in an instantiating process, and a blockchain depositing the certification for the data needing to be received by the current workflow node and the data template received in the instantiating process.

The certification and certification deposition for the data template refers to the certification and certification deposition for specific data in the data template.

Step 5101 of establishing, by a certification party using a JSON language, a general workflow template that includes a plurality of workflow nodes each having an audit attribute for indicating whether the workflow node needs to be certified includes the following steps.

The certification party may be a third-party certification authority, the general workflow template is configured to describe an actual transaction process, a user may determine various nodes that need to be experienced in the transaction process according to transaction and functions to be implemented by a software system, the general workflow template is then defined by the various nodes, and different nodes are connected in series through a specified node to form a complete transaction process. The software system may read and identify these nodes.

Figures 2, 3, 4:
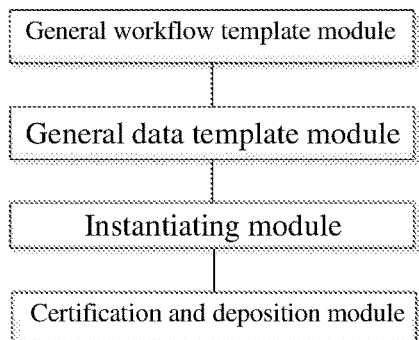
FIG. 2 is a structural diagram of a general workflow template according to the present disclosure.
FIG. 3 is a structural diagram of a general data template according to the present disclosure.
FIG. 4 is a block diagram of components of a blockchain-based workflow node certification device according to the present disclosure.

In the present embodiment, the general workflow template has a structure shown in FIG. 2, and the general workflow template has three fields: process_id, process_name, and definitions. The process_id field is configured to define a unique identifier of a transaction process corresponding to the general workflow template, the process_name field is configured to define a name of the transaction process, and the definitions field is configured to define various workflow nodes needed in the transaction process. Specifically, the definitions field may define a plurality of workflow nodes, and each workflow node has node_id, node_name, title, type, target, render, and audit fields. The node_id field defines a unique identifier of a workflow node, the node_name field defines a name of the workflow node, the title field defines a title of the workflow node, the type field is configured to define a type of the workflow node, and the type of the workflow node includes a start node, an intermediate task node, or an end node. The target field is configured to define a next node ID after the workflow node is executed, and configured to indicate an execution order of the workflow nodes, the render field defines the input and output of the workflow node through the from and to attributes, and the audit field is configured to define whether the node needs to be certified.

Other fields may be set in the general workflow template in combination with specific transaction processes.

A complex transaction process may include a plurality of start nodes. For example, a user may actively initiate the same transaction process and submit relevant information, or a server may passively initiate the same transaction process and acquire the relevant information from the user.

Step S102 of establishing, by the certification party using the JSON language based on the general workflow template, a general data template that defines data needing to be collected and transmitted in a workflow execution process includes the following steps.

In the present embodiment, the general data template has a structure shown in FIG. 3, and the general data template has uuid, name, version, languageType, contentType, required, validation, and content fields. The uuid field is configured to define a unique identifier of the general data template. The name field is configured to define a name of the general data template. The version field is configured to define a version of the general data template. The languageType field defines a language type implementing the general data template. The contentType field defines a data type. The required field defines whether the data is required. The validation field is configured for logical validation, and may contain a validation script or link to external services to determine whether a data format is correct and determine whether data conforms to rules, for example, whether the data is within a predetermined range. The content field may be nested with other data templates.

Other fields may be set in the general data template in combination with specific data needed by the general workflow template.

Step 5103 of instantiating the general data template and the general workflow template includes the following steps.

The general data template may be configured to define data needing to be collected and transmitted in an execution process of the general workflow template. The general data template and the general workflow template are combined to meet the needs of actual transaction processes.

Required data is input according to the transaction process. Specifically, for the start node, the input data is input by the user, and for other workflow nodes, the input data may be data in a data template received by the workflow node.

Step 5104 of acquiring a current workflow node in the instantiated general workflow template, determining, based on the audit attribute, whether the current workflow node needs to be certified, if yes, certifying, by a centralized certification party, data needing to be received or sent by the current workflow node defined in the general workflow template and a data template defined in an instantiating process, and depositing certification, by a blockchain, for the data needing to be received by the current workflow node and the data template received in the instantiating process in which the certification and certification deposition for the data template refers to the certification and certification deposition for specific data in the data template includes the following steps.

In step 51041, a current workflow node in the instantiated general workflow template is acquired, it is determined, based on the audit attribute, whether the current workflow node needs to be certified, if yes, the process proceeds to step 51042, and if no, the process proceeds to step S1044.

step 51042: acquiring the instantiated current workflow node, acquiring data needing to be received or sent, which is defined in the general workflow template by the current workflow node, and a data template defined in an instantiating process, and sending the data and the data template to the certification party for certification audit;

The certification party may be a third-party certification authority, and a certification audit system of the third-party certification authority audits data and data in the data template.

step 51043: after passing the certification audit, performing, by the certification party, Hash calculation on the data and the data template to obtain a Hash value, and sending the Hash value to the blockchain for certification deposition;

The data template participating in the Hash calculation refers to the data in the data template. The reason for not directly uploading original data is that the blockchain is a publicly accessible network, and uploading the original data will cause data leakage. Therefore, the original data is stored in a centralized system of the certification party, and the Hash value is stored on the blockchain, which can ensure the traceability of data in the centralized system.

After the blockchain completes the certification deposition and synchronization, the certification party may obtain an ID of the certification deposition operation, and associate the ID with original data.

In step 51044, it is determined whether the current workflow node is an end node, if yes, the method is ended, and if no, the process proceeds to step 51045.

In step 51045, the current workflow node is set as a next workflow node, and the process proceeds to step 51042.

The following example embodiments illustrate the blockchain-based workflow node certification method of an identity card-based KYC (know-your-customer) certification transaction process.

In step 5201, a certification party defines a KYC general workflow template. In one example, the KYC general workflow template is specifically defined as follows.

```
{
  "process_id":"fa373617-5fb4-4ce2-829e-986c06a0919d",
  "process_name":"KYC Process",
  "definitions":[
    {
      "node_id":"66d4d8db-b7ea-4969-89a1-6723f1dc1167,
      "node_name":"Start",
      "title":"Start process",
      "type":"start",
      "target":"e7b3252c-3d4e-4843-8fce-4dc28d2d7f29"
    },
    {
      "node_id":"e7b3252c-3d4e-4843-8fce-4dc28d2d7f29",
      "node_name":"Submit",
      "title":"Submit info",
      "type":"task",
      "target":"d7f70bc2-4360-40f6-bd6d-69652d2f1180",
      "render":{
        "to":{
          "datamodel":"9435d866-7107-4b7c-8243-180e8c3a0ccc"
        }
      }
    },
    {
      "node_id":"d7f70bc2-4360-40f6-bd6d-69652d2f1180",
      "node_name":"Audit",
      "title":"Audit info",
      "type":"task",
      "target":"c234f757-db7c-438b-a691-42b68720f094",
      "render":{
        "from":{
          "datamodel":"9435d866-7107-4b7c-8243-180e8c3a0ccc"
        }
      },
      "audit":"true
    },
    {
      "node_id":"c234f757-db7c-438b-a691-42b68720f094",
      "node_name":"End",
      "title":"End process",
      "type":"end"
    }
  ]
}
```

The KYC general workflow template has four workflow nodes. The first workflow node is a start node, which represents the start of a KYC transaction process. The start node does not carry out any transaction description, but only informs the KYC transaction process to start from this node. A target attribute of this node indicates information of a next process node.

The second workflow node is a data submission node, which is defined as a task node with a node name Submit, and configured to wait for a user to submit information, and describe, in the to attribute of render, that it should submit a data template set with an ID value to a next node when this node task is ended, that is, a data template with the same ID value, which is defined in the KYC general data template. Only after the user submits data conforming what is defined in the data template, the workflow node will be ended and a next workflow node will be started.

The third workflow node is a data audit node, which is also defined as a task node with a node name Audit, and configured to wait for an audit service provider to audit the data submitted by the user, and describe, in the from attribute of render of the workflow node, a data template needing to be received from a previous node.

In the present embodiment, the to attribute of render is defined in the Submit node, a data template with an ID 9435d866-7107-4b7c-8243-180e8c3a0ccc needs to be transmitted, and target is specified as a node with an id 893b9c55-b915-482d-8723-852fc22e7d26, that is, the Audit node.

Meanwhile, the from attribute of render of the Audit node defines a data template with an ID 9435d866-7107-4b7c-8243-180e8c3a0ccc, which needs to be received. Through the above mode, the transmission of a data template between two workflow nodes has been defined. In an actual process, what is transmitted is not the template itself, but data contained in the template, that is, data information that is filled in by the user and generated through the workflow node.

The fourth workflow node is an end node, which indicates that the KYC transaction process is ended here.

In step S202, the certification party establishes a KYC general data template. The KYC general data template is specifically defined as follows.

```
{
  "uuid":"9435d866-7107-4b7c-8243-180e8c3a0ccc",
  "name":"Person info",
  "version":"1.0",
  "languageType":"vechain",
  "contentType":"other/list",
  "required":true,
  "validation":"",
  "content":[
    {
      "uuid":"66286228-c455-4b82-957c-d1e8b1078f09",
      "name":"Name",
      "version":"1.0",
      "languageType":"vechain",
      "contentType":"text/plain",
      "required":true,
      "validation":""
    },
    {
      "uuid":"1dcabbf0-5e70-4fd4-87ba-e043e7a5c0ad",
      "name":"IDCard",
      "version":"1.0",
      "languageType":"vechain",
      "contentType":"text/plain",
      "required":true,
      "validation":"/^[1-9]\\d{7}((0\\d) | (1[0-2]))(([0 | 1 | 2]\\
    },
    {
      "uuid":"b9e77f0b-121e-4c8a-9bad-31f2cf74e63e",
      "name":"IDCard Photo Front",
      "version":"1.0",
      "languageType":"vechain",
      "contentType":"media/image",
      "required":true,
      "validation":""
    },
    {
      "uuid":"3653da78-0c3c-4d9e-94ff-d642f7706d3a",
      "name":"IDCard Photo Back",
      "version":"1.0",
      "languageType":"vechain",
      "contentType":"media/image",
      "required":true,
      "validation":""
    }
  ]
}
```

The KYC general data template defines four items of information that a user must fill in, including a name, an identity card number, an identity card front photo, and an identity card back photo. A regular expression verification on the identity card number has been added for the identity card number.

After the user fills in the above four items of information, the following data information is obtained. After the data information is extracted, data required in the content field in the KYC general data template is obtained.

```
{
  "uuid":"d8f7576e-1ad9-4148-87b1-6333f777864a",
  "data": {
    "66286228-c455-4b82-957c-d1e8b1078f09":"燚 XX",
    "1dcabbf0-5e70-4fd4-87ba-e043e7a5c0ad":"3526*******1318",
    "b9e77f0b-121e-4c8a-9bad-31f2cf74e63e":"https://xxx.com/image/3526*******1318_f.jpg",
    "3653da78-0c3c-4d9e-94ff-d642f7706d3a":"https://xxx.com/image/3526*******1318_b.jpg"
  }
}
```

Where uuid: unique ID of data, which is generated every time the user submits data.

data: corresponding specific user data containing uuid, specific information for this embodiment being:

66286228-c455-4b82-957c-d1e8b1078f09 is associated with Name in the data template to acquire the name of the user;

1dcabbf0-5e70-4fd4-87ba-e043e7a5c0ad is associated with IDCard in the data template to acquire the identity card number of the user;

b9e77f0b-121e-4c8a-9bad-31f2cf74e63e is associated with IDCard Photo Front in the data template to acquire the identity card front photo of the user;

3653da78-0c3c-4d9e-94ff-d642f7706d3a is associated with IDCard Photo Back in the data template to acquire the identity card back photo of the user.

Preferably, during the acquisition, the system should verify actual data according to the data template defined in the KYC general data template to determine whether the submitted data content is correct.

In step 5203, the KYC general workflow template and the KYC general data template are instantiated based on the KYC general workflow template and the data input by the user.

The KYC general workflow template and the KYC general data template are instantiated, and the instantiated KYC general workflow template and KYC general data template are combined.

In step S204, the determination shows that an audit attribute value in an Audit workflow node is true, indicating that the workflow node needs to be certified. Data needing to be received, which is defined by the Audit workflow node in the general workflow template, and a received data template are acquired. In the present embodiment, what is transmitted is not the template itself, but data contained in the template. The data and the data template are sent to the certification party for certification audit. In the present embodiment, the certification party needs to audit an identity card number, a name, an identity card front photo, and an identity card back photo submitted by the user. After the certification audit is passed, the certification party performs Hash calculation on the data and the data in the data template to obtain a Hash value, and sends the Hash value to a blockchain for certification deposition. After the blockchain completes the certification deposition and synchronization, the certification party may obtain an ID of the certification deposition operation and associate the ID with original data.

FIG. 4 is a functional block diagram of one example of a blockchain-based workflow node certification device according to the present disclosure. In the illustrated example, the device includes:

a general workflow template module, configured to establish, by a certification party, a general workflow template using a JSON language, the general workflow template comprising a plurality of workflow nodes each having an audit attribute for indicating whether the workflow node needs to be certified;

a general data template module, configured to establish, by the certification party, a general data template using the JSON language based on the general workflow template, the general data template defining data needing to be collected and transmitted in a workflow execution process;

an instantiating module, configured to instantiate the general data template and the general workflow template; and a certification and deposition module, configured to acquire a current workflow node in the instantiated general workflow template, determine, based on the audit attribute, whether the current workflow node needs to be certified, if yes, certify, by a centralized certification party, data needing to be received or sent by the current workflow node defined in the general workflow template and a data template defined in an instantiating process, and deposit certification, by a blockchain, for the data needing to be received by the current workflow node and the data template received in the instantiating process, the certification and certification deposition for the data template referring to the certification and certification deposition for specific data in the data template.

Further, the general data template has uuid, name, version, languageType, contentType, required, validation, and content fields, the uuid field is configured to define a unique identifier of the general data template, the name field is configured to define a name of the general data template, the version field is configured to define a version of the general data template, the languageType field defines a language type implementing the general data template, the contentType field defines a data type, the required field defines whether the data is required, the validation field is configured for logical validation, and may contain a validation script or link to external services to determine whether a data format is correct, and the content field may be nested with other data templates.

Further, the certification and deposition module includes:

a first determination sub-module, configured to acquire a current workflow node in the instantiated general workflow template, and determine, based on the audit attribute, whether the current workflow node needs to be certified;

a certification sub-module, configured to acquire the instantiated current workflow node, acquire data needing to be received or sent, which is defined in the general workflow template by the current workflow node, and a data template defined in an instantiating process, and send the data and the data template to the certification party for certification audit;

a deposition sub-module, configured to perform, by the certification party, Hash calculation on the data and the data template after passing the certification audit to obtain a Hash value, and send the Hash value to the blockchain for certification deposition;

a second determination sub-module, configured to determine whether the current workflow node is an end node; and a setting sub-module, configured to set the current workflow node as a next workflow node.

Further, an association sub-module is also included, which is configured to obtain, by the certification party, an ID of the certification deposition operation after the blockchain completes the certification deposition and synchronization, and associate the ID with original data.

An embodiment of the present disclosure further provides a blockchain-based workflow node certification system is provided, including:

a processor, configured to execute a plurality of instructions; and a memory, configured to store the plurality of instructions.

The plurality of instructions are configured to be stored by the memory and loaded by the processor to perform the blockchain-based workflow node certification method as described above.

An embodiment of the present disclosure further provides a computer-readable storage medium. The storage medium stores a plurality of instructions therein that are configured to be loaded by a processor and perform the blockchain-based workflow node certification method as described above.

It should be noted that the embodiments in the present disclosure and the features in the embodiments may be combined with each other without conflict.

In the several embodiments provided by the present disclosure, it should be understood that the disclosed system, device, and method may be implemented in other ways. For example, the device embodiments described above are merely illustrative. For example, the division of the illustrated and described units is only a logical function division, and there may be other divisions in actual implementation. For example, multiple units or components may be combined or may be integrated into another system, or some features may be ignored or not executed. In addition, the displayed or discussed mutual coupling or direct coupling or communication connection may be indirect coupling or communication connection through some interfaces, devices, or units, and may be in electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of the present embodiment.

In addition, the functional units in each embodiment of the present disclosure may be integrated into one processing unit, or each unit may exist alone physically, or two or more units may be integrated into one unit. The above integrated unit may be implemented in the form of hardware or in the form of hardware and a software functional unit.

The above integrated unit implemented in the form of the software functional unit may be stored in a computer-readable storage medium. The above software functional unit is stored in a storage medium and includes a plurality of instructions to make a computer device (which may be a personal computer, a physical server, or a network cloud server, etc., required to be installed with, e.g., Windows or Windows Server operating systems) to perform part of the steps of the method in each embodiment of the present disclosure. The aforementioned storage medium includes one or more of: a U disk, a mobile hard disk, a Read-Only Memory (ROM), a Random Access Memory (RAM), a magnetic disk or an optical disk, and other media that may store program code.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure. Any simple alterations, equivalent changes, and modifications made to the above embodiments based on the technical essence of the present disclosure still fall within the scope of the technical solution of the present disclosure.

The invention claimed is:

1. A blockchain-based workflow node certification method, comprising:

step S101: establishing, by a certification party, a general workflow template, the general workflow template comprising a plurality of workflow nodes each having an audit attribute for indicating whether the workflow node needs to be certified;

step S102: establishing, by the certification party, a general data template based on the general workflow template, the general data template defining data needing to be collected and transmitted in a workflow execution process;

step S103: instantiating the general data template and the general workflow template; and step S104: acquiring a current workflow node in the instantiated general workflow template, determining, based on the audit attribute, whether the current workflow node needs to be certified, if yes, certifying, by a centralized certification party, data needing to be received or sent by the current workflow node defined in the general workflow template and a data template defined in an instantiating process, and depositing certification, by a blockchain, for the data needing to be received by the current workflow node and the data template received in the instantiating process, wherein the certification and certification deposition for the data template are the certification and certification deposition for specific data in the data template, and if no, determining whether the current workflow node is an end node.

2. The blockchain-based workflow node certification method according to claim 1, wherein the general data template has uuid, name, version, languageType, contentType, required, validation, and content fields, the uuid field is configured to define a unique identifier of the general data template, the name field is configured to define a name of the general data template, the version field is configured to define a version of the general data template, the languageType field defines a language type implementing the general data template, the contentType field defines a data type, the required field defines whether the data is required, the validation field is configured for logical validation, and is configured to contain a validation script or link to external services to determine whether a data format is correct, and the content field is configured to be nested with other data templates.

3. The blockchain-based workflow node certification method according to claim 1, wherein step S104 comprises:
step S1041: acquiring a current workflow node in the instantiated general workflow template, determining, based on the audit attribute, whether the current workflow node needs to be certified, if yes, proceeding to step S1042, and if no, proceeding to step S1044;
step S1042: acquiring the instantiated current workflow node, acquiring data needing to be received or sent by the current workflow node, which is defined in the general workflow template by the current workflow node, and a data template defined in an instantiating process, and sending the data needing to be sent by the current workflow node and the data template to the certification party for certification audit;
step S1043: after passing the certification audit, performing, by the certification party, Hash calculation on the data needing to be received by the current workflow node and the data template to obtain a Hash value, and sending the Hash value to the blockchain for certification deposition;
step S1044: determining whether the current workflow node is an end node, if yes, ending the method, and if no, proceeding to step S1045; and
step S1045: setting the current workflow node as a next workflow node, and proceeding to step S1042.

4. The blockchain-based workflow node certification method according to claim 3, wherein after the blockchain completes the certification deposition and synchronization, the certification party obtains an ID of the certification deposition operation, and associates the ID with original data.

5. A blockchain-based workflow node certification device, comprising:
a general workflow template module, configured to establish, by a certification party, a general workflow template, the general workflow template comprising a plurality of workflow nodes each having an audit attribute for indicating whether the workflow node needs to be certified;
a general data template module, configured to establish, by the certification party, a general data template based on the general workflow template, the general data template defining data needing to be collected and transmitted in a workflow execution process;
an instantiating module, configured to instantiate the general data template and the general workflow template; and
a certification and deposition module, configured to acquire a current workflow node in the instantiated general workflow template, determine, based on the audit attribute, whether the current workflow node needs to be certified, if yes, certify, by a centralized certification party, data needing to be received or sent by the current workflow node defined in the general workflow template and a data template defined in an instantiating process, and deposit certification, by a blockchain, for the data needing to be received by the current workflow node and the data template received in the instantiating process, wherein the certification and certification deposition for the data template are the certification and certification deposition for specific data in the data template, and if no, determine whether the current workflow node is an end node.

6. The blockchain-based workflow node certification device according to claim 5, wherein the general data template has uuid, name, version, languageType, contentType, required, validation, and content fields, the uuid field is configured to define a unique identifier of the general data template, the name field is configured to define a name of the general data template, the version field is configured to define a version of the general data template, the languageType field defines a language type implementing the general data template, the contentType field defines a data type, the required field defines whether the data is required, the validation field is configured for logical validation, and is configured to contain a validation script or link to external services to determine whether a data format is correct, and the content field is configured to be nested with other data templates.

7. The blockchain-based workflow node certification device according to claim 5, wherein the certification and deposition module comprises:
a first determination sub-module, configured to acquire a current workflow node in the instantiated general workflow template, and determine, based on the audit attribute, whether the current workflow node needs to be certified;
a certification sub-module, configured to acquire the instantiated current workflow node, acquire data needing to be received or sent by the current workflow node, which is defined in the general workflow template by the current workflow node, and a data template defined in an instantiating process, and send the data needing to be sent by the current workflow node and the data template to the certification party for certification audit;
a deposition sub-module, configured to perform, by the certification party, Hash calculation on the data needing to be received by the current workflow node and the data template after passing the certification audit to obtain a Hash value, and send the Hash value to the blockchain for certification deposition;
a second determination sub-module, configured to determine whether the current workflow node is an end node; and
a setting sub-module, configured to set the current workflow node as a next workflow node.

8. The blockchain-based workflow node certification device according to claim 7, further comprising an association sub-module, configured to obtain, by the certification party, an ID of the certification deposition operation after the blockchain completes the certification deposition and synchronization, and associate the ID with original data.

9. A blockchain-based workflow node certification system, comprising:
a processor, configured to execute a plurality of instructions; and
a memory, configured to store the plurality of instructions, wherein the plurality of instructions are configured to be stored by the memory and loaded by the processor to perform a blockchain-based workflow node certification method, comprising:
step S101: establishing, by a certification party, a general workflow template, the general workflow template comprising a plurality of workflow nodes each having an audit attribute for indicating whether the workflow node needs to be certified;

step S102: establishing, by the certification party, a general data template based on the general workflow template, the general data template defining data needing to be collected and transmitted in a workflow execution process;

step S103: instantiating the general data template and the general workflow template; and step S104: acquiring a current workflow node in the instantiated general workflow template, determining, based on the audit attribute, whether the current workflow node needs to be certified, if yes, certifying, by a centralized certification party, data needing to be received or sent by the current workflow node defined in the general workflow template and a data template defined in an instantiating process, and depositing certification, by a blockchain, for the data needing to be received by the current workflow node and the data template received in the instantiating process, wherein the certification and certification deposition for the data template are the certification and certification deposition for specific data in the data template, and if no, determining whether the current workflow node is an end node.

10. A non-transitory computer-readable storage medium, storing a plurality of instructions therein that are configured to be loaded by a processor and perform a blockchain-based workflow node certification method, comprising:

step S101: establishing, by a certification party, a general workflow template, the general workflow template comprising a plurality of workflow nodes each having an audit attribute for indicating whether the workflow node needs to be certified;

step S102: establishing, by the certification party, a general data template based on the general workflow template, the general data template defining data needing to be collected and transmitted in a workflow execution process;

step S103: instantiating the general data template and the general workflow template; and step S104: acquiring a current workflow node in the instantiated general workflow template, determining, based on the audit attribute, whether the current workflow node needs to be certified, if yes, certifying, by a centralized certification party, data needing to be received or sent by the current workflow node defined in the general workflow template and a data template defined in an instantiating process, and depositing certification, by a blockchain, for the data needing to be received by the current workflow node and the data template received in the instantiating process, wherein the certification and certification deposition for the data template are the certification and certification deposition for specific data in the data template, and if no, determining whether the current workflow node is an end node.

* * * * *